US010232381B2

(12) United States Patent
Frantz

(10) Patent No.: US 10,232,381 B2
(45) Date of Patent: Mar. 19, 2019

(54) PURIFICATION OF ORGANICALLY MODIFIED SURFACE ACTIVE MINERALS BY AIR CLASSIFICATION

(71) Applicant: Halliburton Energy Services, Inc., Houston, TX (US)

(72) Inventor: Eric Benjamin Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 611 days.

(21) Appl. No.: 14/783,452

(22) PCT Filed: Dec. 19, 2014

(86) PCT No.: PCT/US2014/071370
§ 371 (c)(1),
(2) Date: Oct. 9, 2015

(87) PCT Pub. No.: WO2016/099532
PCT Pub. Date: Jun. 23, 2016

(65) Prior Publication Data
US 2016/0326422 A1    Nov. 10, 2016

(51) Int. Cl.
*B02C 23/00* (2006.01)
*B02C 23/38* (2006.01)
(Continued)

(52) U.S. Cl.
CPC .......... *B02C 23/38* (2013.01); *B01D 17/0217* (2013.01); *B02C 4/44* (2013.01);
(Continued)

(58) Field of Classification Search
CPC .......... B02C 23/38; B02C 23/18; C09K 8/34; C09K 8/035
(Continued)

(56) References Cited

U.S. PATENT DOCUMENTS 1,629,182 A    5/1927    Stull
2,702,747 A    2/1955    Studebaker
(Continued)

FOREIGN PATENT DOCUMENTS

CA    2406238 A1    11/2001
CN    102951651 A    3/2013
(Continued)

OTHER PUBLICATIONS

English translation of EP 1949964 A1.*
(Continued)

*Primary Examiner* — Faye Francis
(74) *Attorney, Agent, or Firm* — Tenley Krueger; C. Tumey Law Group PLLC

(57) ABSTRACT

Methods including drying a crude mineral composition including surface active minerals ("SAM") and gangue, grinding the crude mineral composition to produce a crude mineral particulate composition including SAM particulates and gangue particulates, contacting the crude mineral particulate composition with a quaternary ammonium surfactant to form organically modified surface active mineral ("OMSAM") particulates, grinding the crude mineral particulate composition that was contacted with the quaternary ammonium surfactant, and separating a portion of the OMSAM particulates from the gangue particulates using an air classifier.

20 Claims, 1 Drawing Sheet

(51) Int. Cl.
  *B02C 23/18* (2006.01)
  *B02C 23/08* (2006.01)
  *B02C 4/44* (2006.01)
  *C09K 8/035* (2006.01)
  *C09K 8/34* (2006.01)
  *E21B 21/06* (2006.01)
  *B01D 17/02* (2006.01)

(52) U.S. Cl.
  CPC .............. *B02C 23/00* (2013.01); *B02C 23/08* (2013.01); *B02C 23/18* (2013.01); *C09K 8/035* (2013.01); *C09K 8/34* (2013.01); *E21B 21/062* (2013.01)

(58) Field of Classification Search
  USPC ............................................ 241/23, 24.1, 65
  See application file for complete search history.

(56) References Cited

U.S. PATENT DOCUMENTS

| | | | |
|---|---|---|---|
| 3,250,607 | A | 5/1966 | Sawyer et al. |
| 3,831,678 | A | 8/1974 | Mondshine |
| 4,105,578 | A | 8/1978 | Finlayson et al. |
| 4,382,868 | A | 5/1983 | House |
| 4,474,706 | A | 10/1984 | Clay et al. |
| 4,623,398 | A | 11/1986 | Goodman et al. |
| 4,664,842 | A | 5/1987 | Knudson, Jr. et al. |
| 4,695,402 | A | 9/1987 | Finlayson et al. |
| 5,028,351 | A | 7/1991 | Kato et al. |
| 5,075,033 | A | 12/1991 | Cody et al. |
| 5,114,893 | A * | 5/1992 | Hughes .................... B01J 20/12 106/DIG. 4 |
| 5,217,803 | A | 6/1993 | McBride et al. |
| 5,303,871 | A | 4/1994 | Bateson et al. |
| 5,334,241 | A | 8/1994 | Jordan |
| 5,336,647 | A | 8/1994 | Nae et al. |
| 5,358,562 | A | 10/1994 | Nae et al. |
| 5,558,777 | A | 9/1996 | Kemnetz et al. |
| 5,718,841 | A | 2/1998 | Mardis et al. |
| 5,739,087 | A | 4/1998 | Dennis |
| 6,036,765 | A | 3/2000 | Farrow et al. |
| 6,436,523 | B1 | 8/2002 | Avant, Jr. et al. |
| 6,503,495 | B1 | 1/2003 | Alwattari et al. |
| 6,583,209 | B2 | 6/2003 | Mehta et al. |
| 6,730,719 | B2 | 5/2004 | Powell |
| 7,060,942 | B2 | 6/2006 | Friedl et al. |
| 7,160,942 | B2 | 1/2007 | Chaiko |
| 7,220,484 | B2 | 5/2007 | Ton-That et al. |
| 7,521,399 | B2 | 4/2009 | Miller |
| 7,732,380 | B2 | 6/2010 | Miller |
| 7,781,379 | B2 | 8/2010 | Miller |
| 7,867,953 | B2 | 1/2011 | Miller |
| 7,977,410 | B2 | 7/2011 | Nagamatsu et al. |
| 7,985,717 | B2 | 7/2011 | Miller |
| 7,989,402 | B2 | 8/2011 | Dino et al. |
| 8,025,160 | B2 | 9/2011 | Wang et al. |
| 8,157,193 | B2 | 4/2012 | Avant, Jr. et al. |
| 8,236,746 | B2 | 8/2012 | Yanagisawa et al. |
| 8,309,290 | B2 | 11/2012 | Yamamoto et al. |
| 8,309,654 | B2 | 11/2012 | Miyake et al. |
| 8,366,350 | B2 | 2/2013 | Swearingen et al. |
| 8,382,990 | B2 | 2/2013 | Wang et al. |
| 8,580,470 | B2 | 11/2013 | Otsuka et al. |
| 8,591,623 | B2 | 11/2013 | Beall et al. |
| 2006/0118002 | A1 | 6/2006 | Steinmetz et al. |
| 2006/0166839 | A1 * | 7/2006 | Miller ..................... C01B 33/44 507/240 |
| 2006/0166840 | A1 * | 7/2006 | Miller .................... C09K 8/145 507/240 |
| 2006/0199890 | A1 | 9/2006 | Fasulo et al. |
| 2009/0104134 | A1 | 4/2009 | Sengupta et al. |
| 2011/0223384 | A1 | 9/2011 | Whitaker et al. |
| 2012/0031061 | A1 | 2/2012 | Beall et al. |
| 2012/0328672 | A1 | 12/2012 | Conrad et al. |
| 2014/0011712 | A1 | 1/2014 | Frantz |

FOREIGN PATENT DOCUMENTS

| | | |
|---|---|---|
| EP | 1794226 A1 | 6/2007 |
| EP | 1808231 A1 | 7/2007 |
| EP | 1949964 A1 | 7/2008 |
| GB | 597332 A | 1/1948 |
| WO | 1988010142 A1 | 12/1988 |
| WO | 2006036151 A1 | 4/2006 |
| WO | 2011046669 A1 | 4/2011 |
| WO | 2016099532 A1 | 6/2016 |

OTHER PUBLICATIONS

English translation of WO 2011 046669 A1.*
International Search Report and Written Opinion for PCST/US2014/071370 dated Sep. 1, 2015.

* cited by examiner

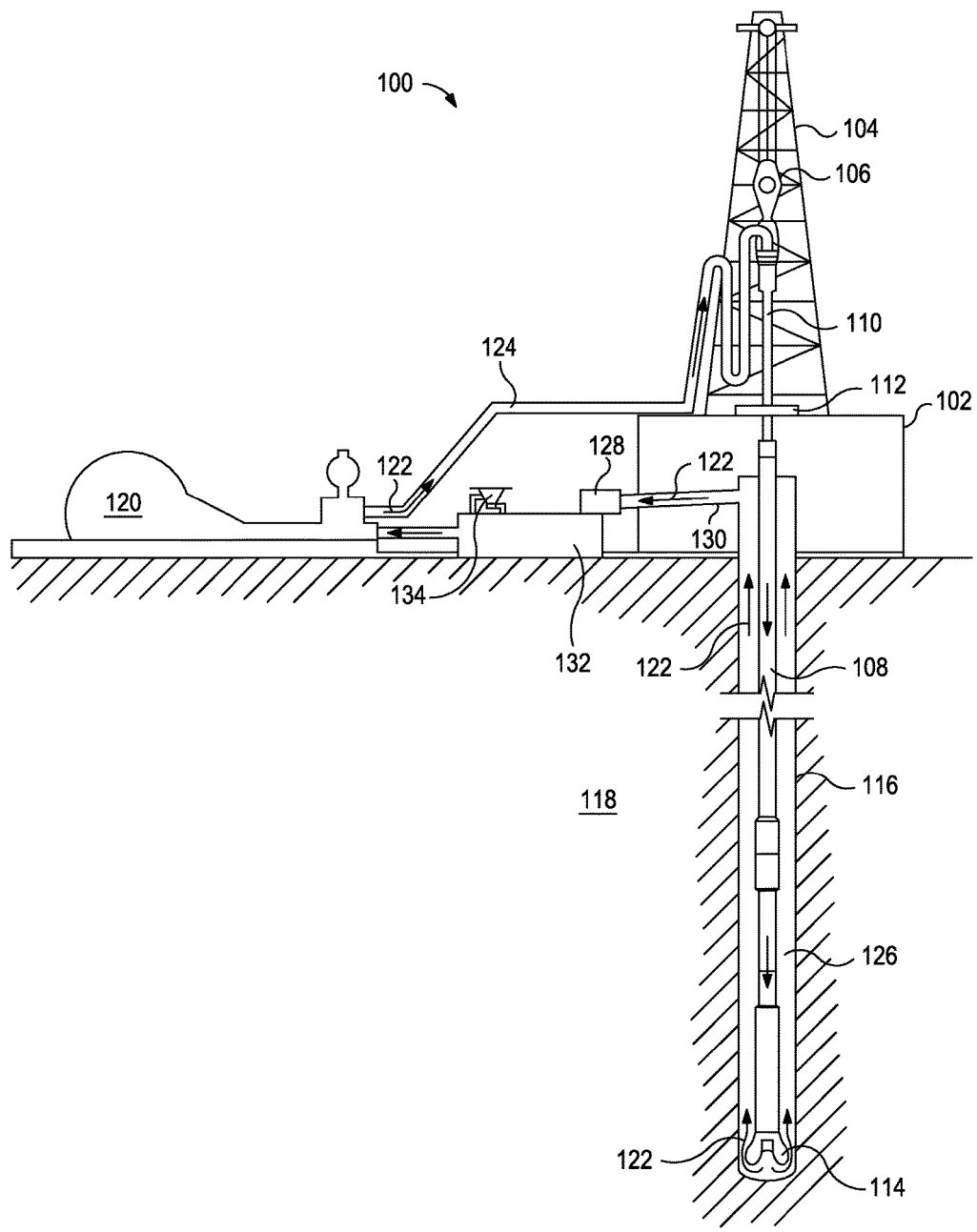

PURIFICATION OF ORGANICALLY MODIFIED SURFACE ACTIVE MINERALS BY AIR CLASSIFICATION

BACKGROUND

The present invention relates to the purification of organically modified surface active mineral particulates by air classification and, more specifically, the purification of organically modified surface active mineral particulates from gangue particulates by air classification based on the size and density of the organically modified surface active mineral particulates compared to the gangue particulates.

As used herein, the term "surface active minerals" ("SAM") are minerals that have exchangeable cations located along the mineral surface. These cations act as charge balance for ionic substitutions that exist within the crystalline structure of the mineral. When reacted with certain cations, such as fatty cationic surfactants, a cation exchange reaction can take place where the new cationic moiety becomes ionically bound to the mineral surface. SAMS reacted with such cations (e.g., the fatty cationic surfactants) in this manner are, as used herein, termed "organically modified surface active minerals" ("OMSAM"). As used herein, a SAM may be a clay or a zeolite, and an OMSAM may be an organoclay or an organozeolite. Unless otherwise specified, the use of the term "SAM" refers to both clays and zeolites, and the term "OMSAM" refers to both organoclays and organozeolites.

The layer of ions of the hydrophilic SAM are exchanged for the organocations of the cationic surfactant causing the tail groups of the cationic surfactant to extend from the SAM, thereby generating an organophilic surface consisting of covalently linked organic moieties and forming an OMSAM. Crude mineral compositions or ore may contain desirable SAMs, as well as undesirable materials, referred to as gangue. As used in the present application, the term "gangue" refers to materials closely mixed with, or surrounding, the desired SAM material. Gangue may include, but is not limited to, amounts of quartz, calcite, chloride salts, and the like. In some cases, gangue may be a non-swellable material whereas the SAM may be either a non-swellable material (e.g., a zeolite) or a swellable material (e.g., an organoclay).

OMSAMs, such as organoclays, may be beneficially swellable in the presence of hydrocarbon fluids (e.g., oils) due to the reaction of the hydrophilic SAM, which is initially swellable in the presence of aqueous fluids, and the cationic surfactant. These organoclays may be used to remove oil from water, as well as a nucleating agent, for example. OMSAMs have wide applicability in a number of industries, ranging from use in oil-based treatment fluids in the oil and gas industry (e.g., as a viscosifying agent) and use in removing oil contamination in environmental cleanup operations, to use in forming cosmetics, lubricant grease formulations, paints, plastic materials, printing inks, polymer nanocomposites, and the like. Although the presence of gangue may be permitted in some such industry applications, it is generally preferred that gangue be minimized or eliminated completely to enhance the operability of the OMSAM. This may be particularly true in applications that permit only a small amount of the OMSAM to be included, such as in cosmetics applications) that require maximum swelling or oil absorption (e.g., by an organoclay). Moreover, gangue may appear in certain applications as a grit-like material, which is particularly disfavored in many applications, for example, the presence of a gritty material in paint is visually unpleasing, gritty materials may interfere and damage metal parts (e.g., bearings), and the like.

Forming substantially purified OMSAM having little or no gangue material mixed therewith is currently formed using a so-called wet slurry process. The wet slurry process involves treating crude mineral ore having desirable SAM materials and undesirable gangue materials with various water processes including washing, separating, drying, grinding, heating, sieving, and passing through an ion exchange columns to remove divalent cations and impurities. Each of these processes are water and energy intensive operations, and furthermore require significant operator time, equipment expense, equipment footprint space and infrastructure, and the like. Such processes additionally create considerable waste streams of water containing gangue and chemical byproducts (e.g., surfactants, salts, and the like) that must be safely disposed. Accordingly, substantially purified OMSAMs (i.e., those having mixed gangue therewith) are currently high-margin products that are expensive to produce and expensive to purchase, thereby driving up the costs of operations or products requiring them.

BRIEF DESCRIPTION OF THE DRAWING

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the OMSAM fluids of the embodiments described herein to a downhole location.

SUMMARY OF THE INVENTION

The present invention relates to the purification of organically modified surface active mineral particulates by air classification and, more specifically, the purification of organically modified surface active mineral particulates from gangue particulates by air classification based on the size and density of the organically modified surface active mineral particulates compared to the gangue particulates.

The embodiments described herein permit the formation of a substantially (i.e., largely, but not necessary wholly) purified OMSAM composition. The embodiments further describe methods for forming the substantially purified OMSAM from crude mineral compositions or ore, which may in the process form other industrially desirable materials. Generally, the methods describe herein permit formation of a substantially purified OMSAM using a reduced equipment footprint, as well as reduced energy, water, process operation time, and the like by utilizing an air classifier. As used herein, the term "substantially purified OMSAM composition," and grammatical variants thereof, refers to a composition of OMSAM having not more than about 5% impurities (i.e., non-OMSAM material), or 95% of OMSAM by weight of the composition.

One or more illustrative embodiments disclosed herein are presented below. Not all features of an actual implementation are described or shown in this application for the sake of clarity. It is understood that numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In one embodiment, the present disclosure provides a method comprising providing a crude mineral composition comprising SAMs and gangue. In some instances, the crude mineral composition, or ore, may comprise an amount of moisture content embedded or absorbed therewith (e.g., within the interstitial spaces between ore particles and SAM particles). In order to prepare the crude mineral composition for purification, it may first be dried or heated to remove an amount of the moisture until the moisture content of the composition is less than about 20%. In some embodiments, it may be desirable to decrease the moisture content to between about 12% and about 8%, or even less, and encompassing any value and subset therebetween. The dried crude mineral composition may then be ground to produce a crude mineral particulate composition comprising SAM particulates and gangue particulates. In some embodiments, the crude mineral composition may be ground to a size of an upper limit of about 100 μm, 90 μm, 80 μm, 70 μm, 60 μm, 50 μm, 40 μm, to a lower limit of about 0.1 μm, 1 μm, 10 μm, 20 μm, 30 μm, and 40 μm, and encompassing any value and subset therebetween. It is not necessary to grind or sieve the dried crude mineral composition to a particular uniform size distribution, although such may be desirable depending on the particular application in which the substantially purified OMSAM is to be used.

Thereafter, the ground crude mineral particulate composition may be contacted with a quaternary ammonium surfactant. At least a portion of the SAM particulates in the ground crude mineral particulate composition comprise reactive sites that react with the quaternary ammonium surfactant, thereby forming OMSAM particulates. The reaction between the quaternary ammonium surfactant and the SAM particulate causes the SAM particulate to transform into an OMSAM.

In some embodiments, the ground crude mineral particulate composition may be produced by a dry process. For example, in some embodiments, the SAM particulates and the quaternary ammonium surfactant may be added to an extruder, comingled, and compressed at high pressure against a perforated die plate. Without being limited by theory, the high pressure and shear at the die plate drives a low solvent melt reaction enabling binding of cationic quaternary ammonium surfactant to the surface of the SAM particulates, thereby producing OMSAM.

In some embodiments, the ground crude mineral particulate composition may be produced by a wet process, such as when the desired SAM is a clay. For example, in some embodiments, the SAM particulates may be treated with the quaternary ammonium surfactant by first hydrating the SAM in water. The slurry may then be heated and stirred while the quaternary ammonium surfactant is added thereto to contact and react with the clay. It may be heated at a temperature in the range of from about 60° C. to about 68° C. (about 140° F. to about 155° F.), and encompassing any value and subset therebetween, for a period of time effective to react the quaternary ammonium surfactant with the SAM surface, so as to form an OMSAM. Thereafter, the OMSAM may be dried by filtering it and heating the resulting filter cake (e.g., spray drying or fluid-bed drying) at a temperature in a range of from about 121° C. to about 75° C. (about 250° F. to about 167° F.), or in some cases about 60° C. to about 68° C. (about 140° F. to about 155° F.), and encompassing any value and subset therebetween, for a period of time effective to dry the filter cake.

In some embodiments, the weight ratio of SAM to the quaternary ammonium surfactant for forming the OMSAMs described herein may range from a lower limit of about 1:1, 3:2; or 2:1 to an upper limit of about 5:1, 4:1, or 3:1, and encompassing any value and subset therebetween.

The OMSAM particulates formed from contacting the SAM particulates with the quaternary ammonium surfactant by any process and the still present gangue particulates may thereafter be ground to a desired particulate size. In some embodiments, the OMSAM particulates and the gangue particulates may be ground to again form particulates from the composition formed during contacting the crude mineral particulate composition with the quaternary ammonium surfactant (i.e., an extruded form during the dry process or a filter cake form during the wet process). In some embodiments, the OMSAM particulates and the gangue particulates may be ground to the same size as was earlier chosen for grinding the crude mineral composition to form the SAM particulates and the gangue particulates; in other embodiments, the OMSAM particulates and the gangue particulates may be ground to a smaller size. Generally, the OMSAM particulates and the gangue particulates may be ground to a size of an upper limit of about 100 μm, 90 μm, 80 μm, 70 μm, 60 μm, 50 μm, 40 μm, to a lower limit of about 0.1 μm, 1 μm, 10 μm, 20 μm, 30 μm, and 40 μm, and encompassing any value and subset therebetween. The OMSAM and gangue particulates may also be further sieved to achieve a particular size distribution, although such is not required according to the embodiments described herein.

In some embodiments, the OMSAM particulates and gangue particulates may again be dried to remove any undesirable moisture introduced as a result of contacting the crude mineral particulate composition with the quaternary ammonium surfactant either before or after grinding the OMSAM particulates and the gangue particulates after the reaction. In some instances, the OMSAM particulates and gangue particulates may be dried or heated to remove an amount of the moisture until the moisture content is less than about 20%, between about 12% and about 8%, or even less, and encompassing any value and subset therebetween. In some embodiments, the OMSAM particulates and gangue particulates may be dried or heated to remove an amount of moisture until the moisture content is less than about 4%, or less than about 2%.

Thereafter, the OMSAM particulates and the gangue particulates are separated using an air classifier based on at least one of the size of the OMSAM particulates, or the density of the OMSAM particulates as compared to the gangue particulates. In some embodiments, the OMSAM particulates and the gangue particulates may be ground to enhance the size difference between the particulates to further enhance purification using the air classifier. In other embodiments, a composition comprising OMSAM particulates and gangue particulates may be provided, such as by purchase, without performing the steps of the methods described herein to form the OMSAM particulates. In such circumstances, the OMSAM particulates may be separated from the gangue particulates using air classification as described herein, without departing from the scope of the present disclosure.

Air classification, as described herein, refers to the use of an air classifier machine capable of separating materials by one or more of their size (including diameter and surface area) and density. For example, in some embodiments, air classification may be used to separate the OMSAM particulates from the gangue particulates first based on size and secondarily based on density. Generally, an air classifier operates by injecting a particulate composition (e.g., the OMSAM and gangue particulate composition described herein) into a chamber containing a separation column of rising air. The separation chamber imposes air drag on the particulate composition therein, which supplies an upward force that counteracts the force of gravity and lifts the particulates into the air in the separation chamber for sorting. Due to the dependence of air drag on particulate size (including diameter and surface area) and density, the particulates moving in the air column may be sorted and separated.

More specifically, in one embodiment, the air classifier for use in the methods described herein may include a variety of components including, for example, a conical-shaped separation chamber having a particulate inlet where the OMSAM particulate and gangue particulate combined composition may be injected into the separation chamber, two air inlets, a fine particulate outlet (or "fines outlet"), and a coarse particulate outlet (or "coarse outlet"). The fines outlet may be located above the coarse outlet relative to the vertical height of the separation chamber. Situated above the fines outlet may be a bladed and rotating classifying wheel, sometimes referred to as a "squirrel cage," mounted to a motor. Within the separation chamber, air is pumped through the two air inlets such that currents are formed which push particulates coming in through the particulate inlet toward the top of the separation chamber into the squirrel cage. As the blades of the squirrel cage rotate, however, a counter air current is formed that pushes particulates toward the lower, course outlet.

Due to the configuration of the air classifier, larger (due to diameter and/or surface area) and denser particulates exit through the coarse outlet as they are pushed down in the separation chamber by the blades of the squirrel cage, while lighter (due to diameter and/or surface area) and less dense particulates exit through the fines outlet as they are pushed by the air current entering at the base or lower portion of the separation chamber. The rate of the incoming air and the speed of the rotating blades of the squirrel cage control the separation of particulate composition. That is, but adjusting the rate of the air current and/or the speed of the rotated blades, the size or density of the particulates captured by the fines and coarse outlets can be controlled. Some overlap between the fines and coarse particulates collected by the fines and coarse outlets, respectively, may occur, without departing from the scope of the present disclosure.

Without being limited by theory, it is believed that typical SAM particulates and gangue material are not generally vastly different in hardness or density and, thus, separation can be difficult. However, the reaction undergone to form the OMSAM, as discussed previously, involves a surface reaction between the SAM and a quaternary ammonium surfactant. The OMSAM may exhibit a specific gravity between about 1.5 and about 2.0, or in some cases between about 1.8 and about 2.0, and encompassing any value and subset therebetween. This specific gravity is reached by taking into account the specific gravity of the organic moiety and the SAM material forming the OMSAM, which may be between about 0.8 and about 1, and 2.0 to about 2.6, respectfully, and encompassing any value and subset therebetween. On the other hand, the gangue particulates may be formed of non-swellable materials including, for example, quartz, calcite, silica, mica, metal sulfate, carbonates, chloride salts, and the like. Some of the gangue particulates are naturally present and some may be formed by the reaction of the clay with the quaternary ammonium surfactant, such as the chloride salts (e.g., calcium chloride, potassium chloride, magnesium chloride). Regardless of their origin, each of these non-swellable materials constitutes gangue material. Such gangue particulates have higher specific gravities than the OMSAM particulates of between about 2.0 and about 3.0, and encompassing any value and subset therebetween. Accordingly, the gangue material will flow toward the coarse outlet and the OMSAM will flow toward the fines outlet to obtain a substantially purified OMSAM based on density.

Additionally, gangue particulates may exhibit a greater measure of hardness compared to OMSAM particulates, particularly organoclays. As used herein, the term "hardness" refers to a measure of how resistant solid matter is to permanent shape change forces. Accordingly, without being limited by theory, it is believed that during the grinding process of the OMSAM particulates and the gangue particulates, after contact with the quaternary ammonium surfactant, the OMSAM particulates will be ground comparatively finer in size (including diameter and/or surface area) than the gangue particulates. As such, similar to the effect of reduced specific gravity on the OMSAM, the reduced size of the OMSAM particulates will aid the flow of the OMSAM towards the fines outlet and the gangue material towards the coarse outlet, thereby allowing collection of a substantially purified OMSAM based on size (including diameter and/or surface area).

The crude mineral compositions described herein comprise SAM and gangue. The gangue may be any non-swellable undesirable material including, for example, quartz, calcite, silica, mica, metal sulfate, carbonates, chloride salts, and the like. In some embodiments, the gangue may be present in an amount of less than about 20% of the crude mineral composition, or less than about 10% of the crude mineral composition.

The SAM in the crude mineral compositions, and the SAM particulates formed therefrom may be natural or synthetic and, may include, but are not limited to, a member of the smectite family, a member of the illite family, a member of the palygorskite-sepiolite phyllosilicate family, a member of the kaolinite family, a member of the zeolite tectosilicate family (e.g., analcime, chabazite, clinoptilolite, erionite, ferrierite, heulandite, laumontite, mordenite, phillipsite natrolite, stilbite, scolecite), nontronite, bentonite, hectorite, attapulgite, smectite, vermiculite, swellable fluoromica, montmorillonite, beidellite, saponite, sepiolite, kaolin, any cation exchanged version thereof, and any combination thereof.

The quaternary ammonium surfactant may, in some embodiments, include surfactants having a composition according to Formula I.

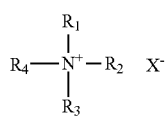

Formula I wherein $R_1$, $R_2$, $R_3$, and $R_4$ are independently selectable $C_1$-$C_{22}$ groups, optionally with at least one functional group (internal, terminal, and/or pendant to at least one carbon) selected from the group consisting of ethers, esters, anhydrides, amines, amides, alcohols, sulfates, sulfonates, thiols, phenols, alkoxides, sulfoxides, ketones, aldehydes, carboxylic acids, carboxylates, nitroalkanes, nitriles, halides, alkene groups, alkyne groups, aryl groups, cyclic groups, alkyl groups, acyl groups, and allyl groups; and wherein $X^-$ is fluoride, chloride, bromide, iodide, any alkyl sulfate such as methyl sulfate or ethyl sulfate, acetate, nitrate, bicarbonate, carbonate, hydroxide, alkoxide, phenoxide, or oligomeric or polymeric anions.

In some embodiments, the quaternary ammonium surfactant may comprise at least one tail group that comprises at least one biodegradable linkage. As used herein, the term "biodegradable linkage" refers to a chemical functionality capable of being decomposed by natural biological processes (e.g., a chemical functionality that undergoes aerobic biodegradation). Examples of biodegradable linkages may, in some embodiments, include, but are not limited to, amides and esters.

Additional suitable quaternary ammonium surfactants may, in some embodiments, include, but are not limited to, a dialkyl dihydrogenated tallow ammonium surfactant, a bis-decyl-diethyl ammonium surfactant, a myristyltrimethyl ammonium surfactant, a cetyltrimethyl ammonium surfactant, a dodecyltrimethyl ammonium surfactant, an ethylhexadecyldimethyl ammonium surfactant, a decyltrimethyl ammonium surfactant, a hexadecyltrimethyl ammonium surfactant, a didodecyldimethyl ammonium surfactant, a propylalkonium-based amide surfactant, any with a chloride counter ion, any with a bromine counter ion, any with a methyl sulfate ion, any in combination with Formula 1, and any combination thereof.

In some embodiments, the substantially purified OMSAM compositions described herein may be used in any industry that may benefit from the properties of the OMSAM, including, for example, the swelling properties of an organoclay in the presence of a hydrocarbon fluid (e.g., their ability to absorb oil). Such industries may include, but are not limited to, use in inks, paints, varnishes, enamels, waxes, paint-varnishes, oil base OMSAM fluids, lubricants and greases, polyesters, epoxy resins, adhesives, sealants, cosmetics, detergents, water-treatment clean up fluids, and the like. In some embodiments, the substantially purified OMSAM compositions may be included into a substantially (largely, but not necessarily wholly) hydrocarbon-based fluid, thereby forming an OMSAM fluid. Such OMSAM fluids may additionally be used in any of the above mentioned industries and/or applications. Any additives common to such industries may additionally be included in the OMSAM fluids described herein, without departing from the scope of the present disclosure.

The OMSAM fluids may thus comprise a substantially purified OMSAM composition and a hydrocarbon-based fluid. Suitable hydrocarbon-based fluids for forming the OMSAM fluids main include, but are not limited to, alkanes, olefins, aromatic organic compounds, cyclic alkanes, paraffins, diesel fluids, mineral oils, desulfurized hydrogenated kerosenes, and the like, and any combination thereof. In some embodiments, an OMSAM fluid may be an invert emulsion with a hydrocarbon-based continuous phase and an aqueous discontinuous phase. Suitable invert emulsions may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, and wherein the ratio may range from any lower limit to any upper limit and encompass any subset therebetween.

In some embodiments, the substantially purified OMSAM composition may be present in the OMSAM fluids described herein in an amount ranging from a lower limit of about 0.5 pounds per barrel ("lb/bbl"), 1 lb/bbl, 2 lb/bbl, or 5 lb/bbl, to an upper limit of about 15 lb/bbl, 12 lb/bbl, 10 lb/bbl, or 5 lb/bbl, encompassing any value and subset therebetween.

In one such application, the OMSAM fluid may be introduced into a subterranean formation to perform a subterranean formation operation. Such subterranean formation operations may include, but are not limited to, a drilling operation; a stimulation operation; a fracturing operation; a frac-packing operation; a packer operation; and any combination thereof.

In some embodiments, the OMSAM fluid may further comprise suitable additives, which may be included for use in any industry application, including a subterranean formation operation. Suitable additives may include, but are not limited to, salts, alkali metal salts, weighting agents, inert solids, fluid loss control agents, high and low shear suspension agents, filtration aids, emulsifiers, dispersion aids, corrosion inhibitors, lubricants, emulsion thinners, emulsion thickeners, deflocculants, viscosifying agents, gelling agents, surfactants, particulates, lost circulation materials, bridging agents, pH control additives, breakers, biocides, stabilizers, scale inhibitors, gas hydrate inhibitors, mutual solvents, oxidizers, reducers, friction reducers, clay stabilizing agents, and the like, and any combination thereof.

As a non-limiting illustration, in some embodiments, the OMSAM fluids described herein may be used to drill at least a portion of a wellbore penetrating a subterranean formation. In some embodiments, the OMSAM fluid may serve as a drill-in fluid designed for wellbore drilling through production zones in a subterranean formation.

The OMSAMs disclosed herein may directly or indirectly affect one or more components or pieces of equipment associated with the preparation, delivery, recapture, recycling, reuse, and/or disposal of the disclosed OMSAM fluids. For example, and with reference to FIG. 1, the disclosed OMSAMs may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates the OMSAM fluid 122 through a feed pipe 124 and to the kelly 110, which conveys the OMSAM fluid 122 downhole through the interior of the drill string 108 and through one or more orifices in the drill bit 114. The OMSAM fluid 122 is then circulated back to the surface via an annulus 126 defined between the drill string 108 and the walls of the borehole 116. At the surface, the recirculated or spent OMSAM fluid 122 exits the annulus 126 and may be conveyed to one or more fluid processing unit(s) 128 via an interconnecting flow line 130. After passing through the fluid processing unit(s) 128, a "cleaned" OMSAM fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the present disclosure.

One or more of the disclosed OMSAMs may be added to form the OMSAM fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed OMSAMs may be added to form the OMSAM fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed OMSAMs may be stored, reconditioned, and/or regulated until added to form the OMSAM fluid 122.

As mentioned above, the disclosed OMSAMs may directly or indirectly affect the components and equipment of the drilling assembly 100. For example, the disclosed OMSAMs may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and any combination thereof. The fluid processing unit(s) 128 may further include one or more sensors, gauges, pumps, compressors, and the like used to store, monitor, regulate, and/or recondition the OMSAMs.

The disclosed OMSAMs may directly or indirectly affect the pump 120, which representatively includes any conduits, pipelines, trucks, tubulars, and/or pipes used to fluidically convey the OMSAMs downhole, any pumps, compressors, or motors (e.g., topside or downhole) used to drive the OMSAM fluid 122 into motion, any valves or related joints used to regulate the pressure or flow rate of the OMSAM fluid 122, and any sensors (i.e., pressure, temperature, flow rate, etc.), gauges, and/or combinations thereof, and the like. The disclosed OMSAMs may also directly or indirectly affect the mixing hopper 134 and the retention pit 132, and their assorted variations.

The disclosed OMSAMs may also directly or indirectly affect the various downhole equipment and tools that may come into contact therewith such as, but not limited to, the drill string 108, any floats, drill collars, mud motors, downhole motors and/or pumps associated with the drill string 108, and any MWD/LWD tools and related telemetry equipment, sensors, or distributed sensors associated with the drill string 108. The disclosed OMSAMs may also directly or indirectly affect any downhole heat exchangers, valves and corresponding actuation devices, tool seals, packers and other wellbore isolation devices or components, and the like associated with the wellbore 116. The disclosed OMSAMs may also directly or indirectly affect the drill bit 114, which may include, but is not limited to, roller cone bits, PDC bits, natural diamond bits, any hole openers, reamers, coring bits, etc.

While not specifically illustrated herein, the disclosed OMSAMs may also directly or indirectly affect any transport or delivery equipment used to convey the OMSAMs to the drilling assembly 100 such as, for example, any transport vessels, conduits, pipelines, trucks, tubulars, and/or pipes used to fluidically move the OMSAM fluid 122 from one location to another, any pumps, compressors, or motors used to drive the OMSAM fluid 122 into motion, any valves or related joints used to regulate the pressure or flow rate of the OMSAM fluid 122, and any sensors (i.e., pressure and temperature), gauges, and/or combinations thereof, and the like.

Embodiments herein include:

Embodiment A

A method comprising: providing a crude mineral composition comprising surface active minerals ("SAM") and gangue; drying the crude mineral composition to have a first moisture content of less than about 20%; grinding the crude mineral composition to produce a crude mineral particulate composition comprising SAM particulates and gangue particulates, contacting the crude mineral particulate composition with a quaternary ammonium surfactant, wherein at least a portion of the SAM particulates react with the quaternary ammonium surfactant to form organically modified surface active mineral ("OMSAM") particulates; grinding the crude mineral particulate composition that has been contacted with the quaternary ammonium surfactant; separating at least a portion of the OMSAM particulates from the gangue particulates using an air classifier, thereby forming a substantially purified OMSAM composition, wherein the separation is based on at least one of the size and density of the OMSAM particulates.

Embodiment B

A method comprising: providing a crude mineral composition comprising surface active minerals ("SAM") and gangue; drying the crude mineral composition to have a first moisture content of less than about 20%; grinding the crude mineral composition to produce a crude mineral particulate composition comprising SAM particulates and gangue particulates, contacting the crude mineral particulate composition with a quaternary ammonium surfactant, wherein at least a portion of the SAM particulates react with the quaternary ammonium surfactant to form organically modified surface active mineral ("OMSAM") particulates; grinding the crude mineral particulate composition that has been contacted with the quaternary ammonium surfactant; separating at least a portion of the OMSAM particulates from the gangue particulates using an air classifier, thereby forming a substantially purified OMSAM composition, wherein the separation is based on at least one of the size and density of the OMSAM particulates; and introducing the substantially purified OMSAM composition into a substantially hydrocarbon-based fluid to form an OMSAM fluid.

Each of Embodiments A and B may have one or more of the following additional elements in any combination:

Element 1: Further comprising drying the crude mineral particulate composition that has been contacted with the quaternary ammonium surfactant to have a second moisture content of less than about 20% prior to the step of: grinding the crude mineral particulate composition that has been contacted with the quaternary ammonium surfactant.

Element 2: Wherein the SAM particulates in the crude mineral composition natural or synthetic, and are selected from the group consisting of a member of the smectite family, a member of the illite family, a member of the palygorskite-sepiolite phyllosilicate family, a member of the kaolinite family, a member of the zeolite tectosilicate family, analcime, chabazite, clinoptilolite, erionite, ferrierite, heulandite, laumontite, mordenite, phillipsite natrolite, stilbite, scolecite, nontronite, bentonite, hectorite, attapulgite, smectite, vermiculite, swellable fluoromica, montmorillonite, beidellite, saponite, sepiolite, kaolin, any cation exchanged version thereof, and any combination thereof.

Element 3: Wherein the quaternary ammonium surfactant is selected from the group consisting of dialkyl dihydrogenated tallow ammonium surfactant, a bis-decyl-diethyl ammonium surfactant, a myristyltrimethyl ammonium surfactant, a cetyltrimethyl ammonium surfactant, a dodecyltrimethyl ammonium surfactant, an ethylhexadecyldimethyl ammonium surfactant, a decyltrimethyl ammonium surfactant, a hexadecyltrimethyl ammonium surfactant, a didodecyldimethyl ammonium surfactant, a propylalkonium-based amide surfactant, any with a chloride counter ion, any with a bromine counter ion, any with a methyl sulfate ion, a surfactant according to Formula 1, and any combination thereof, wherein Formula 1 has the formula:

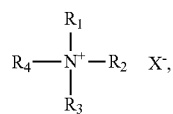

where R1, R2, R3, and R4 are independently selectable C1-C22 groups and X- is one of a fluoride, chloride, bromide, iodide, an alkyl sulfate, acetate, nitrate, bicarbonate, carbonate, hydroxide, alkoxide, phenoxide, an oligomeric anion, or a polymeric anion.

Element 4: Wherein the quaternary ammonium surfactant is selected from the group consisting of dialkyl dihydrogenated tallow ammonium surfactant, a bis-decyl-diethyl ammonium surfactant, a myristyltrimethyl ammonium surfactant, a cetyltrimethyl ammonium surfactant, a dodecyltrimethyl ammonium surfactant, an ethylhexadecyldimethyl ammonium surfactant, a decyltrimethyl ammonium surfactant, a hexadecyltrimethyl ammonium surfactant, a didodecyldimethyl ammonium surfactant, a propylalkonium-based amide surfactant, any with a chloride counter ion, any with a bromine counter ion, any with a methyl sulfate ion, a surfactant according to Formula 1, and any combination thereof, wherein Formula 1 has the formula:

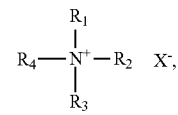

where R1, R2, R3, and R4 are independently selectable C1-C22 groups and X- is one of a fluoride, chloride, bromide, iodide, an alkyl sulfate, acetate, nitrate, bicarbonate, carbonate, hydroxide, alkoxide, phenoxide, an oligomeric anion, or a polymeric anion, and wherein at least one of $R_1$, $R_2$, $R_3$, and $R_4$ further comprises at least one functional group selected from the group consisting of an ether, an ester, an anhydride, an amine, an amide, an alcohol, a sulfate, a sulfonate, a thiol, an alkoxide, a sulfoxide, a ketone, an aldehyde, a carboxylate, a nitroalkane, a nitrile, a hydroxide, a halide, an alkene group, an alkyne group, an aryl group, a cyclic group, an alkyl group, an acyl group, an allyl group, and any combination thereof.

Element 5: Wherein the substantially purified OMSAM composition comprises at least about 95% of OMSAM particulates by weight thereof.

Element 6: Wherein the gangue particulates are substantially non-swellable materials.

Element 7: Wherein the SAM particulates are substantially swellable materials in an aqueous fluid, and wherein the OMSAM particulates are substantially swellable materials in a hydrocarbon fluid.

Element 8: Grinding the crude mineral particulate composition that has been contacted with the quaternary ammonium surfactant, produces a mixture of OMSAM particulates and gangue particulates having a size in the range of from about 0.1 μm to about 100 μm.

Element 9: Introducing the substantially purified OMSAM composition into a substantially hydrocarbon-based fluid to form an OMSAM fluid, and further comprising introducing the OMSAM fluid into a subterranean formation.

Element 10: Introducing the substantially purified OMSAM composition into a substantially hydrocarbon-based fluid to form an OMSAM fluid, and further comprising introducing the OMSAM fluid into a subterranean formation, and further comprising a wellhead with a tubular extending therefrom and into the subterranean formation and a pump fluidly coupled to the tubular, wherein introducing the OMSAM fluid into the subterranean formation comprises introducing the OMSAM fluid through the tubular.

By way of non-limiting example, exemplary combinations applicable to A and B include: 1 and 2; 1 and 3; 1 and 4; 1 and 5; 1 and 6; 1 and 7; 1 and 8; 1 and 9; 1 and 10; 2 and 3; 2 and 4; 2 and 5; 2 and 6; 2 and 7; 2 and 8; 2 and 9; 2 and 10; 3 and 4; 3 and 5; 3 and 6; 3 and 7; 3 and 8; 3 and 9; 3 and 10; 4 and 5; 4 and 6; 4 and 7; 4 and 8; 4 and 9; 4 and 10; 5 and 6; 5 and 7; 5 and 8; 5 and 9; 5 and 10; 6 and 7; 6 and 8; 6 and 9; 6 and 10; 7 and 8; 7 and 9; 7 and 10; 8 and 9; 8 and 10; 9 and 10; 1, 2 and 3; 1, 4, and 7; 1, 8, and 10; 2, 8, and 9; 3, 4, and 9; 1, 4, 5, and 8; 2, 5, 6, and 10; 4, 6, 7, and 9.

To facilitate a better understanding of the embodiments of the present invention, the following example of a representative embodiment is given. In no way should the following example be read to limit, or to define, the scope of the invention.

EXAMPLE

In this example, a size classification experiment was performed to separate an OMSAM, an organoclay in this example, from gangue. The clay used in this experiment was a commercially available organoclay produced as the reaction product of a high yielding sodium bentonite and dimethyl dihydrogenated tallow ammonium chloride (quaternary ammonium surfactant). The sample was sifted through an array of sieves shown in Table 1. Next, each sample shown in Table 1 was subjected to thermal gravimetric analysis (TGA) to determine if the smaller sized fraction has a higher percent loss-on-ignition (% LOI) and percent organic loss-on-ignition (% OLOI). As used herein, the term "percent loss-on-ignition" means the percent of the total mass loss at a given temperature due to thermal ignition, and the term percent organic loss-on-ignition" means the amount of organic mass loss as a percent of the total mass at a given temperature due to thermal ignition. A high resolution, high sensitivity thermograph was obtained for each sample by heating the sample to 1000° C. at 5° C./minute in air. The % LOI was calculated based on the total reduction in mass after the samples were heated to 1000° C. The % OLOI was calculated based on the reduction in mass between the ranges of 152-168° C. and 394-415° C. The % OLOI represents organic content from the quaternary ammonium surfactant.

As shown in Table 1, it can be seen from the data that the 83.20% sub 325 mesh organoclay has the highest % LOI and % OLOI in the series. With the exception of the 25×100 mesh fraction, the % LOI and % OLOI trends up as the particle size goes down, which is desirable. The 25×100 mesh sample may indicate possible experimental error or contamination of the sample, and is considered an outlier based on the remaining results.

The results in Table 1 indicate that, as the extruded organoclay passes through the mill, the components containing the highest concentration of soft, organic material resulting from the reaction of quaternary amine with the clay are ground finer than components that have reacted with the quaternary amine to a lesser degree due to increased gangue content and are, consequently, harder. These are the results of a size classification experiment only with particle size as the only differentiator for the material. With the use of air classification, particle mass would additionally fine-tune the separation as an additional differentiator, making the separation even more effective.

TABLE 1

| Sample No. | Sample Size (mesh) | Weight % | % LOI | % OLOI |
| --- | --- | --- | --- | --- |
| 1 | Unsieved organoclay | N/A | 36.79 | 24.62 |
| 2 | >20 | 0.03 | — | — |
| 3 | 25 × 100 | 0.23 | 38.42 | 21.93 |
| 4 | 100 × 200 | 2.28 | 31.91 | 17.35 |
| 5 | 200 × 270 | 4.84 | 33.10 | 19.38 |
| 6 | 270 × 325 | 9.46 | 36.35 | 21.88 |
| 7 | <325 | 83.20 | 39.22 | 25.07 |

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing an air classifier;
providing a crude mineral composition comprising surface active minerals ("SAM") and gangue;
drying the crude mineral composition to have a first moisture content of less than about 20%;
grinding the crude mineral composition to produce a crude mineral particulate composition comprising SAM particulates and gangue particulates,
contacting the crude mineral particulate composition with a quaternary ammonium surfactant,
wherein at least a portion of the SAM particulates react with the quaternary ammonium surfactant to form organically modified surface active mineral ("OMSAM") particulates;
grinding the crude mineral particulate composition that has been contacted with the quaternary ammonium surfactant;
separating at least a portion of the OMSAM particulates from the gangue particulates using the air classifier, thereby forming a substantially purified OMSAM composition,
wherein the separation is based on at least one of the size and density of the OMSAM particulates,
wherein separating the at least a portion of the OMSAM particulates from the gangue particulates using the air classifier comprises injecting the at least a portion of the OMSAM particulates into a chamber containing a separation column of rising air.

2. The method of claim 1, further comprising drying the crude mineral particulate composition that has been contacted with the quaternary ammonium surfactant to have a second moisture content of less than about 20% prior to the step of: grinding the crude mineral particulate composition that has been contacted with the quaternary ammonium surfactant.

3. The method of claim 1, wherein the SAM particulates in the crude mineral composition are natural or synthetic, and selected from the group consisting of a smectite, an illite, a palygorskite-sepiolite phyllosilicate, a kaolinite, a zeolite tectosilicate, analcime, chabazite, clinoptilolite, erionite, ferrierite, heulandite, laumontite, mordenite, phillipsite natrolite, stilbite, scolecite, nontronite, bentonite, hectorite, attapulgite, smectite, vermiculite, swellable fluoromica, montmorillonite, beidellite, saponite, sepiolite, kaolin, any cation exchanged version thereof, and any combination thereof.

4. The method of claim 1, wherein the quaternary ammonium surfactant is selected from the group consisting of dialkyl dihydrogenated tallow ammonium surfactant, a bis-decyl-diethyl ammonium surfactant, a myristyltrimethyl ammonium surfactant, a cetyltrimethyl ammonium surfactant, a dodecyltrimethyl ammonium surfactant, an ethylhexadecyldimethyl ammonium surfactant, a decyltrimethyl ammonium surfactant, a hexadecyltrimethyl ammonium surfactant, a didodecyldimethyl ammonium surfactant, a propylalkonium-based amide surfactant, any with a chloride counter ion, any with a bromine counter ion, any with a methyl sulfate ion, a surfactant according to Formula 1, and any combination thereof, wherein Formula 1 has the formula:

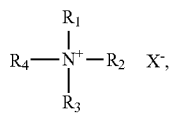

where $R_1$, $R_2$, $R_3$, and $R_4$ are independently selectable $C_1$-$C_{22}$ groups and X– is one of a fluoride, chloride, bromide, iodide, an alkyl sulfate, acetate, nitrate, bicarbonate, carbonate, hydroxide, alkoxide, phenoxide, an oligomeric anion, or a polymeric anion.

5. The method of claim 4, wherein at least one of $R_1$, $R_2$, $R_3$, and $R_4$ further comprises at least one functional group selected from the group consisting of an ether, an ester, an anhydride, an amine, an amide, an alcohol, a sulfate, a sulfonate, a thiol, an alkoxide, a sulfoxide, a ketone, an aldehyde, a carboxylate, a nitroalkane, a nitrile, a hydroxide, a halide, an alkene group, an alkyne group, an aryl group, a cyclic group, an alkyl group, an acyl group, an allyl group, and any combination thereof.

6. The method of claim 1, wherein the substantially purified OMSAM composition comprises at least about 95% of OMSAM particulates by weight thereof.

7. The method of claim 1, wherein the gangue particulates are substantially non-swellable materials.

8. The method of claim 1, wherein the SAM particulates are substantially swellable materials in an aqueous fluid, and wherein the OMSAM particulates are substantially swellable materials in a hydrocarbon fluid.

9. The method of claim 1, grinding the crude mineral particulate composition that has been contacted with the quaternary ammonium surfactant, produces a mixture of OMSAM particulates and gangue particulates having a size in the range of from 0.1 µm to 100 µm.

10. A method comprising:
providing an air classifier;
providing a crude mineral composition comprising surface active minerals ("SAM") and gangue;
drying the crude mineral composition to have a first moisture content of less than about 20%;
grinding the crude mineral composition to produce a crude mineral particulate composition comprising SAM particulates and gangue particulates,
contacting the crude mineral particulate composition with a quaternary ammonium surfactant,
wherein at least a portion of the SAM particulates react with the quaternary ammonium surfactant to form organically modified surface active mineral ("OMSAM") particulates;
grinding the crude mineral particulate composition that has been contacted with the quaternary ammonium surfactant;
separating at least a portion of the OMSAM particulates from the gangue particulates using the air classifier, thereby forming a substantially purified OMSAM composition,
wherein the separation is based on at least one of the size and density of the OMSAM particulates,
wherein separating the at least a portion of the OMSAM particulates from the gangue particulates using the air classifier comprises injecting the at least a portion of the OMSAM particulates into a chamber containing a separation column of rising air; and
introducing the substantially purified OMSAM composition into a fluid containing a hydrocarbon to form an OMSAM fluid.

11. The method of claim 10, further comprising drying the crude mineral particulate composition that has been contacted with the quaternary ammonium surfactant to have a second moisture content of less than about 20% prior to the step of: grinding the crude mineral particulate composition that has been contacted with the quaternary ammonium surfactant.

12. The method of claim 10, wherein the SAM particulates in the crude mineral composition are natural or synthetic, and selected from the group consisting of a smectite, an illite, a palygorskite-sepiolite phyllosilicate, a kaolinite, a zeolite tectosilicate, analcime, chabazite, clinoptilolite, erionite, ferrierite, heulandite, laumontite, mordenite, phillipsite natrolite, stilbite, scolecite, nontronite, bentonite, hectorite, attapulgite, smectite, vermiculite, swellable fluoromica, montmorillonite, beidellite, saponite, sepiolite, kaolin, any cation exchanged version thereof, and any combination thereof.

13. The method of claim 10, wherein the quaternary ammonium surfactant is selected from the group consisting of a dialkyl dihydrogenated tallow ammonium surfactant, a bis-decyl-diethyl ammonium surfactant, a myristyltrimethyl ammonium surfactant, a cetyltrimethyl ammonium surfactant, a dodecyltrimethyl ammonium surfactant, an ethylhexadecyldimethyl ammonium surfactant, a decyltrimethyl ammonium surfactant, a hexadecyltrimethyl ammonium surfactant, a didodecyldimethyl ammonium surfactant, any with a chloride counter ion, any with a bromine counter ion, any with a methyl sulfate ion, a surfactant according to Formula 1, and any combination thereof, wherein Formula 1 has the formula:

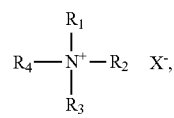

where $R_1$, $R_2$, $R_3$, and $R_4$ are independently selectable C1-C22 groups and X– is one of a fluoride, chloride, bromide, iodide, an alkyl sulfate, acetate, nitrite, bicarbonate, carbonate, hydroxide, alkoxide, phenoxide, an oligomeric anion, or a polymeric anion.

14. The method of claim 13, wherein at least one of $R_1$, $R_2$, $R_3$, and $R_4$ further comprises at least one functional group selected from the group consisting of an ether, an ester, an anhydride, an amine, an amide, an alcohol, a sulfate, a sulfonate, a thiol, an alkoxide, a sulfoxide, a ketone, an aldehyde, a carboxylate, a nitroalkane, a nitrile, a hydroxide, a halide, an alkene group, an alkyne group, an aryl group, a cyclic group, an alkyl group, an acyl group, an allyl group, and any combination thereof.

15. The method of claim 10, wherein the substantially purified OMSAM composition comprises at least about 95% of OMSAM particulates by weight thereof.

16. The method of claim 10, wherein the gangue particulates are substantially non-swellable materials.

17. The method of claim 10, wherein the SAM particulates are substantially swellable materials in an aqueous fluid, and wherein the OMSAM particulates are substantially swellable materials in a hydrocarbon fluid.

18. The method of claim 10, grinding the crude mineral particulate composition that has been contacted with the quaternary ammonium surfactant, produces a mixture of OMSAM particulates and gangue particulates having a size in the range of from 0.1 µm to 100 µm.

19. The method of claim 10, further comprising introducing the OMSAM fluid into a subterranean formation.

20. The method of claim 19, further comprising a wellhead with a tubular extending therefrom and into the subterranean formation and a pump fluidly coupled to the tubular, wherein introducing the OMSAM fluid into the subterranean formation comprises introducing the OMSAM fluid through the tubular.

* * * * *